INVENTOR.
MILLARD ROMAINE
ERWIN G. ROEHM
BY
Parsons
ATTORNEY.

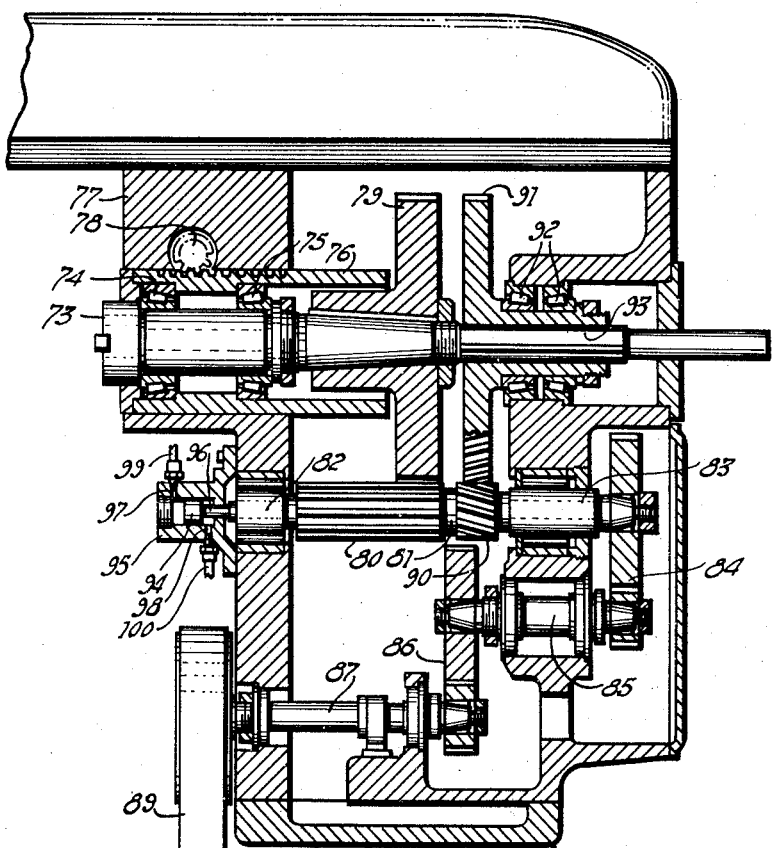

Patented Nov. 17, 1942

2,302,575

UNITED STATES PATENT OFFICE 2,302,575

BACKLASH ELIMINATOR FOR SPINDLE DRIVES

Millard Romaine, Cincinnati, and Erwin G. Roehm, Norwood, Ohio, assignors to The Cincinnati Milling Machine Co., Cincinnati, Ohio, a corporation of Ohio Application October 3, 1940, Serial No. 359,578

11 Claims. (Cl. 90—11)

This invention relates to machine tools and more particularly to improvements in the spindle driving mechanism thereof.

One of the objects of this invention is to provide improved means for driving machine tool spindles especially those equipped with toothed cutters that are apt to set up vibratory reactions in the spindle driving mechanism.

Another object of this invention is to provide improved means for locking out backlash in a spindle driving mechanism.

Another object of this invention is to provide improved means for locking out backlash in a reversible spindle drive, together with control means for determining the direction of drive and for locking out the backlash for that direction.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 4 is a sectional view showing a modified form of the invention.

Figure 5 is a diagrammatic view of a control circuit for the mechanism shown in Figure 4.

Figure 1:
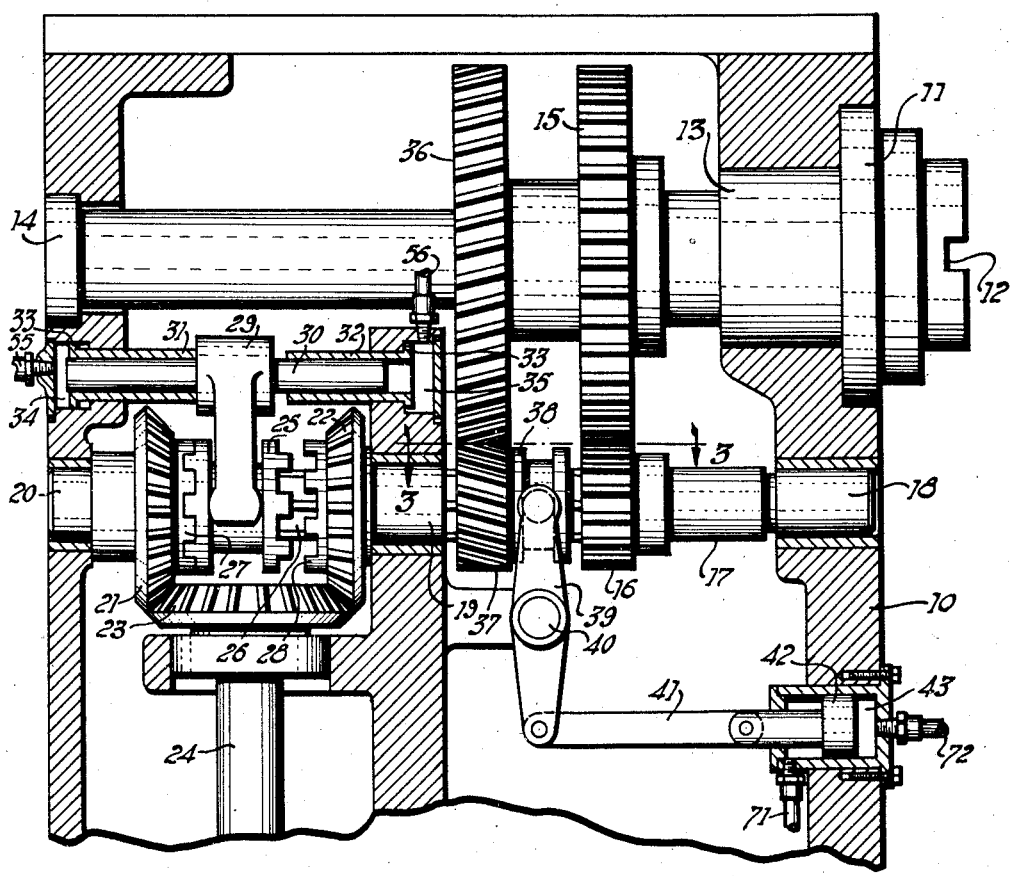
Figure 1 is a section through a machine tool showing the application of this invention to the spindle driving mechanism thereof.

Referring to Figure 1 of the drawings the reference numeral 10 indicates a portion of the supporting frame of a machine tool and for illustrative purposes this may be a portion of the column of a milling machine having a cutter spindle 11, to the nose 12 of which various toothed cutters may be operatively connected for rotation thereby. It is well known that toothed cutters create a definite period of vibration due to the intermittent engagement of the cutter teeth with the work and this creates a constantly varying power demand on the transmission whereby a vibration or hammering occurs between the gears of the transmission which is very objectionable. This invention aims to substantially reduce or eliminate any lost motion between the intermeshing gears of the transmission and especially the final gears of said transmission whereby the amplitude of vibration is materially reduced so that the hammering effect is removed.

The spindle 11 which is journaled at 13 and 14 in the column by means of suitable anti-friction bearings is illustrated as having the usual large face gear 15 fixed with the spindle and a driving pinion 16 intermeshing therewith and fixedly attached to a supporting shaft 17. This shaft is journaled at spaced points 18, 19 and 20 in the column.

The shaft 17 supports a pair of beveled gears 21 and 22 for free rotation and these gears are continuously driven in opposite directions by a bevel gear 23 attached to the upper end of a power driven shaft 24. A shiftable reversing clutch 25 is splined at 26 on the shaft 17 for axial movement relative thereto.

The bevel gears 21 and 22 are provided with clutch teeth 27 and 28 on their opposing faces for engagement by similar clutch teeth formed on the opposite ends of the clutch member 25. The clutch 25 is provided with a shifter fork 29 which is mounted on a shifter rod 30. The ends of the shifter rod serve as pistons and are surrounded by centralizing sleeves 31 and 32. The ends of the sleeves are provided with shoulders 33 for engagement with the ends of cylinders 34 and 35.

When pressure is admitted to cylinder 35 it acts on the end of the sleeve 32 and the end of the shifter rod 30, shifting them to the left to effect engagement of the clutch with clutch teeth 27. Since at this time there is no pressure in cylinder 34, the sleeve 31 will be shifted by the shifter fork so as not to interfere with engagement of the clutch. Should pressure be admitted to both cylinders, however, the sleeves 31 and 32 will move toward one another and centralize the clutch in a stop position so that no power will be transmitted to the spindle. When pressure is admitted to cylinder 34 and cylinder 35 is connected to exhaust, the clutch will be shifted into engagement with the clutch teeth 28 to reverse the direction of the spindle.

The means for locking out backlash between the driving pinion 16 and the driven gear 15 includes a pair of helical gears 36 and 37 which are of the same ratio as the gears 15 and 16. The helical gear 36 is fixed with the spindle 11, while the helical gear 37 is splined on the shaft 17 for axial movement relative to the shaft and to the helical gear 36. The gear 37 is provided with a spool 38 and a shifter fork 39, the latter being pivoted at 40 to a fixed part of the machine. A link 41 connects the shifter fork to a fluid operable piston 42 slidably mounted in a cylinder 43.

Figure 3:
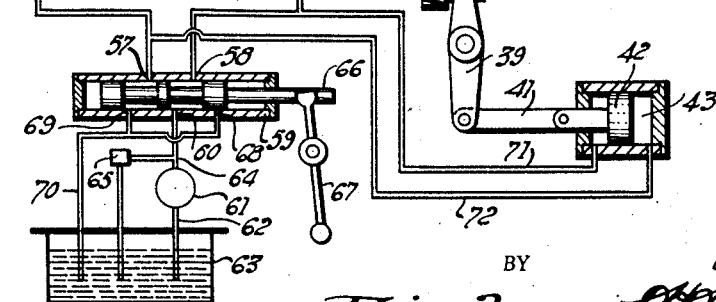
Figure 3 is a section on the line 3—3 of Figure 1.

It should now be apparent that selective admission of pressure to the cylinder 43 will effect opposite shifting of pinion 37 relative to gear 36. The manner in which the backlash is locked out may be more clearly understood by reference to the diagram in Figure 3. In this figure the reference numeral 44 indicates a tooth on the pinion 16 while the reference numeral 45 indicates teeth on the gear 15. A tooth on the spiral pinion is represented by the reference numeral 46 and the teeth on the spiral gear 36 are represented by the reference numeral 47.

Assuming now that the desired direction of rotation of the spindle and gear 15 is in the direction of arrow 48, the spiral pinion 37 is shifted in the direction of arrow 49 whereby the pinion tooth 46 moves into engagement with the inclined face 50 of tooth 47. It will be apparent that if there is nothing to constrain the axial movement of gear 36, the tooth 46 will cause movement of the teeth 47 in the direction of arrow 51, thus producing movement of the teeth 45 of gear 15 in the direction of arrow 52 because the gears 36 and 15 are connected together for joint movement. This will move a gear tooth 45 on gear 15 into engagement with the driving face 53 of pinion tooth 44, and thereby remove any clearance that might exist between the driving face 53 and the teeth 45.

It should now be apparent that the gears 36 and 15 are locked against rotation in one direction by tooth 44 and against rotation in the other direction by the tooth 46. When power is applied to gear tooth 44 in the direction of arrow 48, it causes rotation of gears 15 and 36. On account of the helical angle of the teeth on gear 36, a reactionary thrust is produced on pinion 37 opposite to the arrow 49, which thrust is absorbed by the hydraulic pressure in cylinder 43. In other words, the hydraulic pressure imposes a rotational urge on the spindle in a direction opposite to its direction of rotation. If the desired direction of rotation of the spindle is reversed the hydraulic pressure in cylinder 43 is reversed and the gear tooth 46 is shifted to the right to lock out the backlash in the opposite direction. The face 54 of pinion tooth 44 now becomes the driving face.

Figure 2:
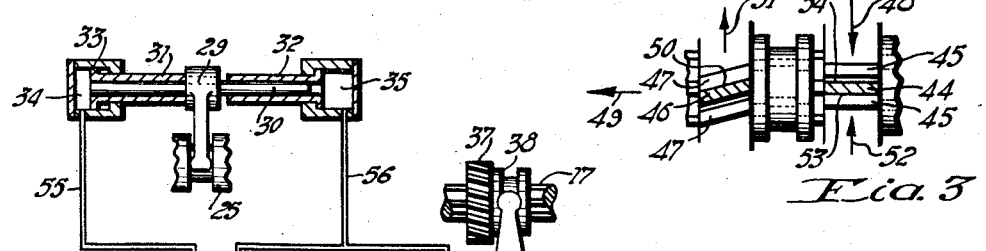
Figure 2 is a diagrammatic view of the hydraulic control circuit for controlling the direction of drive and the directional application of the backlash eliminator.

It will now be obvious that the direction of pressural urge on the spiral pinion should be coordinated with the desired direction of rotation of the spindle. This is accomplished automatically by means of the control mechanism shown in Figure 2. As there shown, the cylinders 34 and 35 which determine the direction of rotation of the spindle are connected by channels 55 and 56 to ports 57 and 58 respectively of a reversing valve 59. This valve has a pressure port 60 which is supplied by a pump 61 having an intake 62 through which fluid is withdrawn from a reservoir 63. The pump delivery channel 64 is provided with a relief valve 65 to control the pressure in the system.

The reversing valve has a plunger 66 which is shiftable by the manual control 67 into any one of three positions. When the plunger is in a central position the port 60 is connected to both ports 57 and 58 which thereby centralize the reversing clutch 25. When shifted to the right the pressure port 60 is connected to port 57 and port 58 is connected to the exhaust port 68, thereby shifting the clutch to effect one direction of rotation of the spindle. When the plunger is shifted to the left the pressure port 60 is connected to port 58 and the port 57 is connected to the exhaust port 69, thereby shifting the clutch to effect the other direction of rotation of the spindle. The ports 68 and 69 are connected to a return channel 70.

The opposite ends of cylinder 43 are connected by channels 71 and 72 respectively to channels 56 and 55 whereby the piston 42 is shifted in accordance with the shifting of the reversing clutch, whereby the backlash is locked out in accordance with the direction of rotation of the spindle.

A modified form of the invention is shown in Figures 4 and 5. In Figure 4 the cutter spindle 73 is journaled at 74 and 75 in a quill 76 which is axially adjustable relative to the support 77 by rack and pinion means 78. The spindle has a drive gear 79 keyed thereto and movable jointly with the spindle upon adjustment of the quill.

The spur gear 79 is driven by the spur gear or pinion 80, the latter being elongated to permit axial adjustment of the gear 79 with the quill. The pinion 80 is integral with a shaft 81 which is journaled at 82 and 83 in the housing 77, and driven through rate change gearing 84 by shaft 85. The shaft 85 is connected by spur gearing 86 to the power shaft 87. The power shaft is actuated by a prime mover in the form of an electric motor 88 which is connected to the power shaft by the belt 89.

The means for removing backlash in the spindle drive comprises a helical pinion 90 which is integral with the shaft 81, and an intermeshing helical gear 91 which is journaled in bearings 92 in the support 77 and fixed against axial movement. The spiral gear 91 has, however, a spline connection at 93 with the spindle 73 whereby the spindle may be adjusted by the quill and relative to the helical gear.

The backlash is removed by shifting the entire shaft 81 axially in one direction or the other, thereby producing relative axial movement between the helical pinion 90 and the gear 91. This is accomplished by mounting a piston 94 in a cylinder 95 which is mounted adjacent the end of shaft 81 and co-axial therewith. The piston rod 96 is connected to the shaft so that it may pull the shaft or push it as the circumstances require. Operation of the piston 94 is controlled as before, the cylinder having a pair of ports 97 and 98 at opposite ends which are connected by channels 99 and 100 to a reversing valve 101. This valve has a plunger 102 which is manually shifted by a control lever 103.

Fluid pressure is supplied to the valve by a pump 104 which withdraws fluid from a reservoir 105, and suitable return lines 106 are provided for returning the exhaust fluid to the reservoir.

The reversal of the cutter spindle is effected in this case by reversing the direction of rotation of the motor 88. An electrical control circuit for this purpose is shown in Figure 5 and comprises a forward switch 107 and a reverse switch 108. The switch 107 has a starter coil 109 which, when energized, closes the switch 107 and connects the power means 110, 111 and 112 to the motor lines 113, 114 and 115 respectively. The switch 108 has a starter coil 116 which, when energized, will close the switch 108 and connect the power means 110, 111 and 112 to the motor lines in reverse order, that is, 115, 114 and 113 respectively. It will be noted that one end of the coils 109 and 116 is permanently connected to the power main 110. The other end of coil 109 is connected by line 117 to switch contact 118, and the other end of coil 116 is connected by line 119 to switch contact 120.

The contacts 118 and 120 constitute part of a double pole, double throw limit switch which also has contacts 121 and 122 which are both connected to power main 112. The limit switch which is indicated generally by the reference numeral 123 has a contactor 124 which in one position interconnects contacts 120 and 121, thereby energizing coil 116 and in the other position interconnects contacts 118 and 122, thereby energizing coil 109 and deenergizing coil 116. Suitable spring means, such as indicated at 125, serve to open switches 107 and 109 when their coils are deenergized.

The limit switch is operatively connected with the valve plunger 102 for joint operation therewith by the manual control 103. Thus, the elimination of backlash may be synchronized with the direction of rotation of the motor. A main control switch 126 may be provided for stopping the motor and thereby the spindle.

There has thus been provided a simple and improved means for locking out backlash in a spindle drive mechanism, together with suitable control means whereby the backlash may be locked out automatically in accordance with the direction of spindle rotation.

What is claimed is:

1. In a machine tool having a spindle, the combination with a power drive shaft, of spur gearing for connecting said shaft for rotation of the spindle, a pair of helical gears mounted on the spindle and shaft respectively, and means for imparting a relative axial shifting between said helical gears in a direction to produce a rotational urge on the spindle opposite to that produced by said gearing to lock out backlash in the drive gearing.

2. In a machine tool having a spindle and a power drive shaft therefor, the combination with spur gearing operatively connecting the drive shaft for rotation of the spindle, of a pair of intermeshing helical gears mounted on the shaft and spindle respectively, and fluid operable means for effecting a relative axial shifting between said helical gears to produce a rotational urge on the spindle in a direction opposed to the direction of rotation produced by said gearing to lock out backlash therein.

3. In a machine tool having a spindle and a power drive shaft therefor, the combination with spur gearing operatively connecting the drive shaft for rotation of the spindle, of a pair of helical gears mounted on the spindle and drive shaft respectively, a direction determinator operative to select the direction of rotation of the spindle, a fluid operable member for effecting a relative axial shifting between said helical gears for imparting a rotational urge to said spindle, and means controlled by said determinator for determining the direction of movement of said member and thus determine the direction of the rotational urge on the spindle with respect to the direction of spindle rotation.

4. In a machine tool having a cutter spindle, a drive shaft and spur gearing operatively connecting the drive shaft to the spindle, of a power shaft, a reversing mechanism for operatively connecting the power shaft to the drive shaft for opposite directions of rotation thereby, fluid operable means for shifting said reverser, and means for eliminating backlash from said gearing including intermeshing helical gears mounted on the spindle and drive shaft respectively, a fluid operable piston for effecting a relative axial shifting between said helical gears to impart a rotational urge on the spindle opposite to the direction of rotation imparted thereto by the drive shaft, a source of pressure, a control valve for determining the connection of pressure to said fluid operable reversing means, and means simultaneously controlled by said valve for determining the direction of relative axial shifting between said helical gears whereby backlash will be eliminated regardless of the direction of rotation of the spindle.

5. In a machine tool having a spindle, the combination with a power drive shaft, of drive gearing for connecting said shaft for rotation of the spindle, a pair of helical gears mounted on the spindle and shaft respectively, and means for imparting a relative axial shifting movement between said helical gears in a direction to produce a rotational urge on the spindle opposite to that produced by said drive gearing to eliminate backlash therefrom.

6. In a machine tool having a spindle and a power drive shaft therefor, the combination with motion transmitting means operatively connecting the drive shaft for rotation of the spindle, of a pair of intermeshing helical gears mounted on the shaft and spindle respectively, and fluid operable means for effecting a relative axial shifting movement between said helical gears to produce a rotational urge on the spindle in a direction opposed to the direction of power rotation to eliminate backlash from said motion transmitting means.

7. In a machine tool having a spindle and a power drive shaft therefor, the combination with gearing operatively connecting the drive shaft for rotation of the spindle, of a pair of helical gears mounted on the spindle and drive shaft respectively, a direction determinator operative to select the direction of rotation of the spindle, a power operable member for effecting a relative axial shifting movement between said helical gears for imparting a rotational urge to said spindle, and means controlled by said determinator for determining the direction of movement of said power operable member and thus determine the direction of the rotational urge on the spindle with respect to the direction of spindle rotation.

8. In a machine tool having a spindle and a power driven shaft therefor, the combination with a first pair of intermeshing gears operatively connecting the drive shaft for rotation of the spindle, of a pair of helical gears of the same ratio as the first pair of gears and mounted on the spindle and drive shaft respectively, a directional control lever, means operable by the lever for determining the direction of rotation of the drive shaft, a reversible power operable member for effecting a relative axial shifting between said helical gears for imparting rotational urge to said spindle to eliminate backlash from said first pair of gears, and means controlled by said lever for determining the direction of operation of said power operable means.

9. In a machine tool having a spindle and a power drive shaft therefor, the combination with intermeshing gears operatively connecting the drive shaft for rotation of the spindle, of a pair of helical gears mounted on the spindle and drive shaft respectively, a power shaft, a control lever, means controlled by said lever for reversibly coupling the power shaft to said drive shaft and power operable means simultaneously controlled by said lever for determining the direction of relative shifting between said helical gears to eliminate backlash from said gearing in accordance with the direction of rotation thereof.

10. In a machine tool having a spindle and a power drive shaft therefor, the combination with intermeshing gears operatively connecting the drive shaft for rotation with the spindle, of a pair of helical gears of the same ratio as the intermeshing gears and mounted on the spindle and drive shaft respectively, control means including a directional control lever for determining the direction of rotation of said drive shaft, a fluid operable member for effecting relative axial shifting between the said helical gears for imparting a rotational urge to said spindle to eliminate backlash from said intermeshing gears, and valve means coupled for control of said lever for determining the admittance of fluid pressure to said member in accordance with the direction of rotation of said drive shaft whereby backlash will be eliminated from said intermeshing gearing regardless of the direction of rotation thereof.

11. In a machine tool having a spindle and a drive shaft therefor, the combination with intermeshing gearing operatively connecting the drive shaft for rotation of the spindle, of a pair of helical gears mounted on the spindle and drive shaft respectively, an electrical prime mover for said drive shaft, control means for the prime mover including a control lever for determining the direction of actuation of said prime mover, fluid operable means for effecting relative shifting between said helical gears for eliminating backlash from said intermeshing gearing, a source of fluid pressure, a control valve for reversibly connecting said source of fluid pressure to said fluid operable means, and means connecting said control valve for control by said lever.

MILLARD ROMAINE.
ERWIN G. ROEHM.